Sept. 22, 1953

L. E. SOMERS 2,652,911

HYDRAULIC TRANSMISSION

Filed Oct. 8, 1948

INVENTOR.
LYSLE E. SOMERS,
BY
Robert N Fulander
ATTORNEY.

Sept. 22, 1953      L. E. SOMERS      2,652,911

HYDRAULIC TRANSMISSION

Filed Oct. 8, 1948      2 Sheets-Sheet 2

INVENTOR.
LYSLE E. SOMERS,
BY
Robert W. Fuelander
ATTORNEY.

Patented Sept. 22, 1953

2,652,911

UNITED STATES PATENT OFFICE 2,652,911

HYDRAULIC TRANSMISSION

Lysle E. Somers, Los Angeles, Calif.

Application October 8, 1948, Serial No. 53,433

7 Claims. (Cl. 192—61)

My invention relates to the field of transmissions, and more particularly to a hydraulic transmission adapted to smoothly transmitting the rotation of a driving shaft to a driven shaft.

Although the advantages of hydraulic power transmissions have been known for a number of years, and various types of these devices have been designed and marketed, the majority of these transmissions have a complicated mechanical structure, are bulky and cumbersome in appearance, uncertain in operation, and require the services of a skilled mechanic to maintain them in an operating condition. It is to eliminate the disadvantages of the previous hydraulically operated transmissions that I have devised my present invention which when once installed operates automatically with little or no attention.

A major object of my invention is to provide a hydraulic transmission which will eliminate the need for a clutch and the shifting of gears, and will permit the rotation of a driving shaft to be transmitted to a driven shaft with a cushioning effect, with the harsh mechanical action being totally eliminated as the driving shaft places the driven shaft in operation.

Another object of my invention is to provide a hydraulic transmission which permits the driven shaft to be placed smoothly in operation from a stationary position, even when the driving shaft is accelerated to a relatively high speed.

Another object of my invention is to provide a hydraulic coupling as hereinafter described in which oil may be employed as the liquid element, with the assurance that the movable parts in the device will be at all times in a perfectly lubricated condition.

A further object of my invention is to supply a hydraulic transmission which has a relatively simple mechanical structure, is silent in operation, can be fabricated from standard commercially available material, is easily installed between a driving and a driven shaft by a person having ordinary mechanical ability, is automatic in operation, and requires little or no maintenance attention after installed other than the replacing of the hydraulic fluid from time to time.

These and other objects and advantages of my invention will become apparent from the following description of a preferred form thereof, and from the drawings illustrating that form in which.

Figure 1:
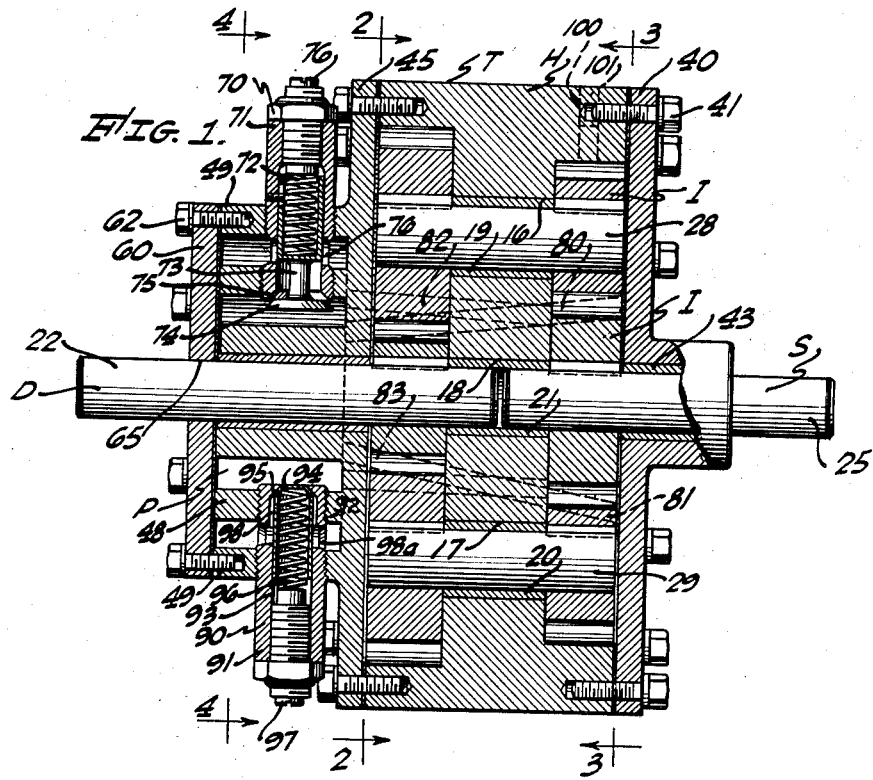
Fig. 1 is a vertical cross sectional view of my hydraulic transmission.

Referring now to Fig. 1 for the general arrangement of my invention it will be seen that a driving shaft D rotates a driven shaft S through my hydraulic transmission T which is disposed therebetween. The hydraulic transmission T includes a cylindrical housing H which contains two impellers I that are actuated by the rotation of the driving shaft D to pump hydraulic fluid into a high pressure chamber P, which results through the use of valve means hereinafter described in the driving shaft D and driven shaft S being locked together as an integral unit through the housing H.

The housing H which is cylindrical in form is preferably cast or formed from a solid piece of metal such as steel, and has two vertically spaced annular chambers 10 and 11 respectively, extending inwardly from the forward face thereof. An annular recess 12 is formed between the chambers 10 and 11, and serves to place them in communication with one another. Extending inwardly from the rearward face of the housing H are two vertically spaced annular cavities 13 and 14 respectively, which are placed in communication with one another by an intermediately positioned annular recess 15.

A horizontally positioned bore 16 of annular cross section extends longitudinally through the housing H to connect the chamber 10 with the cavity 13, and a similar bore 17 connects the chamber 11 with the cavity 14. A bore 18 of annular cross section extends through the housing H on the longitudinal axis thereof to connect the recesses 12 and 15.

The bores 16, 17 and 18 are each provided with sleeves 19, 20 and 21 respectively, that are preferably formed from copper or brass, and serve as bearings. Of course, should it be desired, antifriction bearings such as ball or roller bearings can be employed for this purpose.

The driving shaft D has its inner end portion 22 rotatably supported within the confines of the housing H in the sleeve bearing 21, with the shaft portion inside the housing supporting a driving gear 23 which is affixed thereto by a conventional key 24. The driven shaft S likewise has its inner end portion 25 rotatably supported in the sleeve bearing 21, and has a driving gear 26 affixed to the shaft portion within the housing by a conventional key 27.

Figure 2:
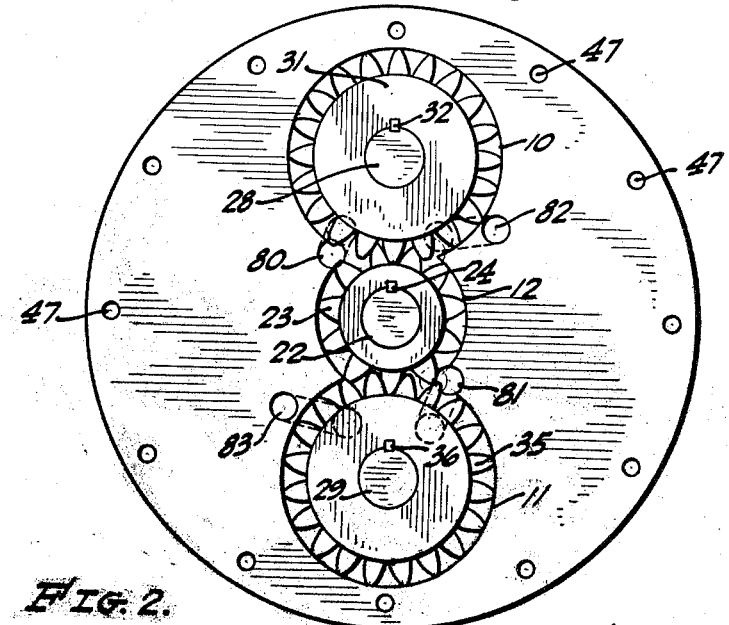
Fig. 2 is a vertical cross sectional view of the device taken on the line 2—2 of Fig. 1.
Figure 3:
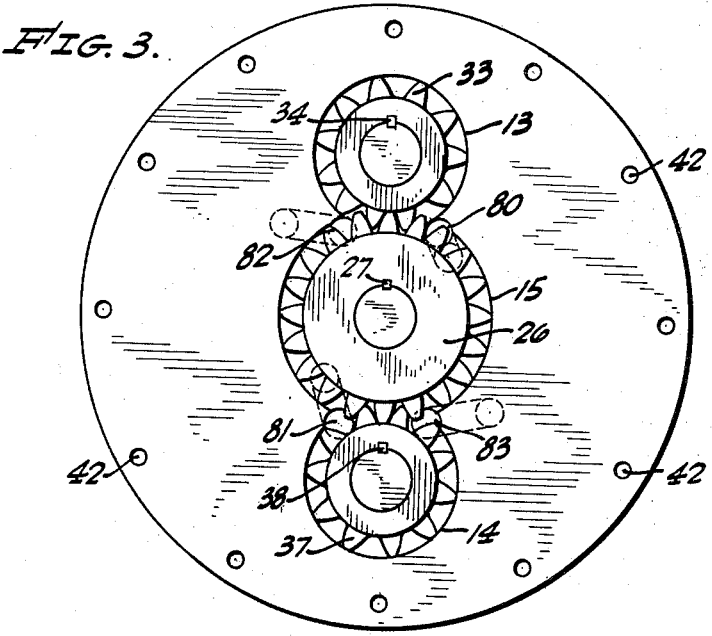
Fig. 3 is a vertical cross sectional view of the device taken on the line 3—3 of Fig. 1.

The driving gear 23 and the driven gear 26 as best seen in Figs. 2 and 3 are situated in the recesses 12 and 15 respectively. The sleeve bearings 19 and 20 rotatably support horizontally positioned shafts 28 and 29, respectively, with each of the shafts being of substantially the same length as the housing H. A pinion 31 is situated within the confines of the chamber 10, and is affixed to the forward portion of the shaft 28 by a key 32. The opposite end of the shaft 28 has a geared tooth impeller 33 affixed thereto by a key 34, with the impeller fit snugly yet rotatably within the confines of the cavity 13. Shaft 29 has a pinion 35 affixed to its forward end by a key 36, and has a geared tooth impeller 37 affixed to its rearward end by a key 38, with the impeller being rotatably mounted within the confines of the cavity 14. Thus, it will be seen that the driving gear 23 and driven gear 26 are mechanically connected at all times as well as hydraulically, as will hereinafter be explained.

The rearward face of the housing H as can best be seen in Fig. 1, has an annular cover plate 40 situated thereon which is held in place by a number of bolts 41 that engage tapped bores 42 formed in both the plate and the housing. The cover plate 40 is formed with a centrally disposed horizontal bore in which is inserted a bearing sleeve 43 that rotatably supports a portion of the driving shaft S. The forward face of the housing H is engaged by an annular cover plate 45 which will hereinafter be discussed in greater detail, which is held in place on the housing by a number of radially spaced bolts 46 that engage suitably tapped bores 47 formed in both the plate and the housing.

Figure 4:
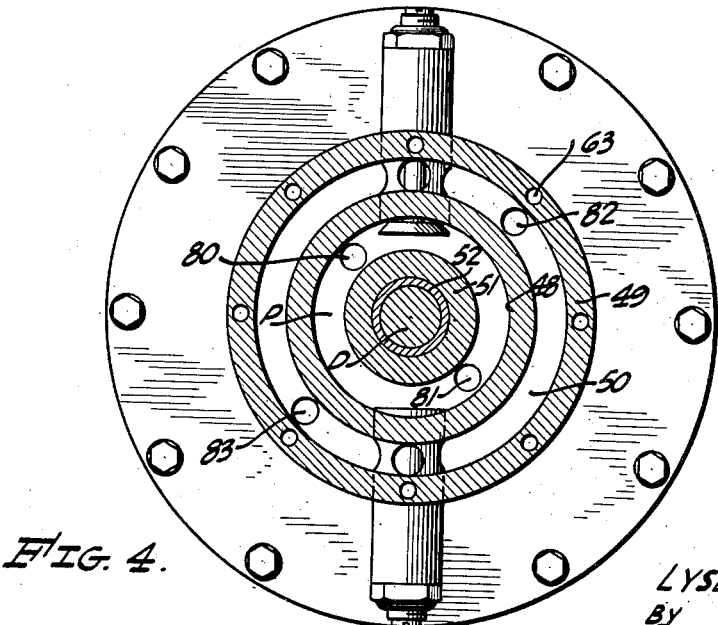
Fig. 4 is a vertical cross sectional view of the device taken on the line 4—4 of Fig. 1.

In Figs. 1 and 4 it will be noted that the cover plate 45 is formed with two concentric annular flanges 48 and 49 which extend outwardly from the forward face thereof, with the annular space existing therebetween serving as a low pressure hydraulic fluid chamber 50 as will hereinafter be explained. A centrally disposed cylindrical boss 51 extends outwardly from the forward face of the cover plate 45 the same distance as the flanges 48 and 49. The boss 51 is formed with a horizontally disposed bore in which a bearing sleeve 52 is inserted to rotatably support a portion of the driving shaft D. The annular space formed between the exterior surface of the boss 51 and the inner surface of the flange 48 constitutes the high pressure hydraulic fluid chamber P.

An annular cover plate 60 having a resilient gasket 61 mounted on the interior face thereof engages the vertical faces of the flanges 48, 49 and the boss 51, with the plate being held in place by a number of radially spaced bolts 62, each of which engages suitably threaded bores 63 formed in the flange 49. The cover plate 60 is formed with a horizontal, centrally disposed bore 65 which permits the driving shaft D to pass therethrough.

A pressure control valve 70 having a vertically positioned threaded tubular body 71, is inserted into a tapped bore formed in the upper portion of the flange 49 as may best be seen in Fig. 1. A helical spring 72 is situated within the confines of the body 71, and at all times urges a plunger 73 downwardly. The plunger 73 has a frusto conical valve member 74 formed on the lower end thereof which is adapted to seat in the lower valve body portion 75 that is threaded in a vertical bore formed in the upper portion of the flange 48. The valve body 71 on its upper portion is provided with a conventional screw member 76 which permits the desired tension to be placed on the helical spring 72 with the result that fluid passing upwardly through the body 71 will cause the member 74 to be seated when a predetermined velocity has been reached. Thus, fluid having a low velocity will pass from the high pressure chamber P to the lower pressure chamber 50 through horizontal ports 76 formed in the sides of the valve body 71 without interference, but upon the predetermined velocity having been attained the valve member 74 assumes the closed position to prevent further flow of fluid from the high pressure fluid chamber P.

In Fig. 1 it will be seen that two angularly disposed bores 80 and 81 extend longitudinally through the housing H from the cavities 13 and 14 respectively, to terminate on their forward end in the high pressure fluid chamber P as best seen in Fig. 4. It will also be noted that two longitudinally extending bores 82 and 83 extend rearwardly from the lower pressure chamber 50 to terminate in the cavities 13 and 14 respectively.

For reasons which will hereinafter become apparent a fluid control valve 90, which includes a tubular valve body 91, is threaded into an upwardly extending vertical bore formed in the lower portion of the flange 49. The lower portion 92 of the valve body is threaded into a vertically extending tapped bore formed in the lower portion of the flange 48. The valve body 91 is formed with a longitudinally extending bore 93 that slideably supports a tube valve member 94 which is formed with a closed conical valve seat 95 on one end thereof. A helical spring 96 is situated within the confines of the valve member 94, with the lower end of the spring resting on the bottom of the member, and the upper end of the spring engaging an adjustment screw 97 that is threaded into the upper portion of the body 91. Formed in the lower portion of the valve body 91 is a counterbore 98 of slightly larger diameter than the bore 93 and in communication therewith. The outer extremity of the bore 98 develops into an annular tapered valve seat 99 which is engaged by the conical portion of the valve member 95. A pair of diametrically opposed ports 98a are formed in the body 91, and are in communication with the counterbore 98. Thus, as sufficient fluid pressure is applied against the exposed end of the valve member 94 it is moved upwardly against the compression of spring 96, and as upward movement of member 94 takes place fluid is permitted to flow into the annular space in the counterbore 98 existing between the surface of the counterbore and the exterior surface of the valve member 94 to escape from the high pressure fluid chamber P into the low pressure fluid chamber 50 through the ports 98a.

The operation of my hydraulic transmission is extremely simple, and when installed as a connection between the driving shaft D and driven shaft S as shown in Fig. 1 its action is entirely automatic. By the use of a vertical bore 100 extending inwardly from the exterior of the housing H to one of the cavities 13 or 14, sufficient hydraulic fluid is introduced within the confines of my device to permit its operation. Upon completion of the hydraulic fluid being introduced into the transmission a threaded plug 101 is caused to engage the tapped portion of the bore 100.

The driving shaft D is connected to a source of motive power (not shown) and the driven shaft S is likewise connected to the particular piece of machinery (not shown) which is desired to be actuated. Driving shaft D is now permitted to rotate slowly in a clockwise direction with the result that the pinions 31 and 35 are rotated in a counterclockwise direction. The pinions 31 and 35 of course, drive the impellers 33 and 37, and as the driven member S is stationary the cylindrical housing H rotates in a counterclockwise direction around the stationary driven gear 15. During the time the impellers 33 and 37 rotate with reference to the driven gear 15 they are serving as a pump to force hydraulic fluids from the cavities 13 and 14 through the bores 80 and 81, respectively, into the high pressure chamber P. However, as long as the driving shaft D is rotated at a relatively low speed the fluid entering the high pressure chamber P flows upwardly through the tubular valve body 71 into the low pressure chamber 50 at a sufficiently low velocity so as not to cause the valve member 74 to be seated. The fluid after entering the low pressure chamber 50 flows through the bores 82 and 83 to the cavities 13 and 14 whence the pumping process is again repeated. Thus, when the driving shaft D is being rotated at an idling speed, the housing H is rotated in a counter-clockwise direction without the driven shaft S being placed in operation. Under these conditions insufficient fluid is pumped to the high-pressure chamber P to seat the valve member 74, the driven shaft D consequently is not rotated, and my transmission serves in the capacity of a clutch.

Upon it being desired to have the driven shaft S rotated by the driving shaft D, the speed of the latter shaft is increased to a point where the fluid being discharged from the cavities 13 and 14 by the impellers 33 and 37 to the high-pressure fluid chamber P is in sufficient volume that it escapes therefrom through the valve 70 at a sufficiently high velocity to cause the valve member 74 to be seated. With the valve member 74 seated the high-pressure fluid chamber P is completely closed, and fluid can no longer be discharged through the bores 80 and 81 by rotation of the impellers 33 and 37. During the time that the valve member 74 is seated there is a tendency to prevent the impellers 33 and 37 from rotating, and the driving shaft D and the driven shaft S are locked together as an integral unit by the transmission T if the load on the driven shaft S is not too heavy.

To fully understand the operation of my transmission, we will assume that the driven shaft S is subjected to a heavy load. The driving shaft D is rotating at an idling speed, with the result that fluid is being pumped by the impellers 33 and 37 through the bores 80 and 81 to the high-pressure fluid chamber P, where the fluid escapes by passing upwardly through the valve 70 to enter the low-pressure chamber 50. From the low-pressure fluid chamber 50 the fluid flows through the bores 82 and 83 to be returned to the impellers 33 and 37, whence the pumping operation is again repeated. The speed of rotating the driving shaft D is now increased to the extent that the impellers 33 and 37 are discharging fluid to the high-pressure chamber P in sufficient volume that its velocity of escape therefrom through the valve 70 is sufficient to cause the valve member 74 to be seated. During this time the housing H is rotating in a counterclockwise direction due to the driven shaft S remaining in a stationary position.

With the valve 70 closed there is a tendency for the impellers 33 and 37 to stop rotating further due to the fluid discharged to the high-pressure chamber P being prevented from escaping therefrom by the valve 70 having assumed the closed position. However, the load on the driven shaft S is sufficiently great to prevent its rotation, with the result that fluid pressure builds up in the high-pressure chamber P until it is sufficient to compress the helical spring 96 and start flowing through the valve 90 into the low-pressure chamber 50. The fluid, discharged into chamber 50 through the valve 90 is returned to the impellers 33 and 37 through the bores 82 and 83, whereupon the fluid is again discharged by the impeller through the bores 80 and 81.

In attempting to rotate the driven shaft S the speed of rotation of the driving shaft D is constantly increased by the operator, with the result that the housing H rotates faster and faster in a counter-clockwise direction, and a constantly increasing volume of fluid is pumped by the impellers 33 and 37 to be discharged through the valve 90. During this operation the helical spring 96 is constantly attempting to seat the valve member 94, and the fixed orifice entrance into the counter-bore 98 builds up a greater and greater back pressure on the fluid being discharged through the bores 80 and 81 by the impellers 33 and 37. Eventually a point is reached whereby the combined efforts of the valve 90 attempting to assume the closed position, and the back pressure on the fluid built up by the fluid flowing through the fixed entrance into the counter bore 98, is of sufficient magnitude that it prevents the impellers 33 and 37 from rotating. At this point the inertia of the load on the driven shaft S is overcome, and the shaft starts to rotate.

As the driven shaft S starts to slowly rotate due to the rapid rotation of the driving shaft D, the speed of rotation of the housing H in a counterclockwise direction begins to lessen, as the housing H only rotates in a clockwise direction when there is a differential in the speed of rotation between the driving shaft D and driven shaft S. To more fully illustrate the operation of my transmission, it will be assumed that the gear ratio between the driving shaft D and the driven shaft S when the housing H is stationary is three and one-half to one. In addition, it will be assumed that the driven shaft S begins to rotate one revolution per minute when the driving shaft D is rotated one hundred revolutions per minute. With the driven shaft S rotating, the speed of the driving shaft D is further increased until at one hundred and ten revolutions the driven shaft S is rotating at eleven revolutions per minute. Thus, as the speed of the driving shaft D is increased the speed of rotation of the driven shaft S also increases and the ratio between the two tends to be lowered, with the ratio between shaft D and shaft S at all times being entirely dependent on the torque load.

In the example given the ratio between the driving shaft D and the driven shaft S was initially one hundred to one. However, as the speed of the driving shaft D is increased the ratio between it and the driven shaft is reduced to eleven to one. As this increase in speed of rotation of the driving shaft D continues the ratio between the driving and the driven shaft is constantly lowered, with a corresponding reduction in the speed of rotation of the housing H in a counterclockwise direction. This decrease in the speed of rotation of the housing H continues as the ratio between the driving shaft D and the driven shaft S is decreased until the ratio of three and one-half to one is reached, which is the gear ratio through the housing H when it is in a stationary position. From the stationary position the housing H begins to rotate in a clockwise direction with the driving shaft D and the driven shaft S, until the housing H and the driven shaft S are rotating at the same speed. During the rotation of the housing H in a clockwise direction the ratio between the driving shaft D and the driven shaft S, disregarding hydraulic slippage, is one to one. Upon the speed of rotation of the driven shaft S beginning to lag behind the speed of rotation of the driving shaft D the housing H again starts to rotate in a counterclockwise direction with the impellers 33 and 37 now rotating to pump fluid to the high pressure chamber P where the previously described operation again takes place until the driving shaft D and the driven shaft are again in a ratio of one to one.

In actual operation the driving shaft D and the driven shaft S will rotate at the same speed so long as the hydraulic fluid pressure in chamber P is sufficient to maintain the valve member 74 in the closed position. Upon the pressure of the fluid in the chamber P dropping sufficiently to permit the valve member 74 to assume the open position, due to the compression on the helical spring 72, the impellers 33 and 37 will start to rotate with relation to the driven gear 15 to immediately cause hydraulic fluid to be pumped to the chamber P through the bores 80 and 81. This increased flow of hydraulic fluid to the chamber P increases the velocity of flow through the valve 70 to again place the valve member 74 in the closed position where the above described process is again repeated.

In addition to its previously described function the valve 90 serves as a relief valve to prevent any jolting or harsh mechanical action as the valve member 74 is suddenly seated to cause the transmission T to lock the driving shaft D and the driven shaft S together as an integral unit. The valve 90 is normally closed, and is only opened when the hydraulic pressure rises above the normal operating pressure such as occurs when the valve member 74 seats or when the driven shaft S is subjected to a heavy load.

It will be apparent from the preceding description that my hydraulic transmission permits the driving shaft D and the driven shaft S to be connected both mechanically and hydraulically at all times. Thus, if the hydraulic transmission T is used in a power vehicle, and the vehicle is traveling down grade, the compression on the engine can be employed for braking purposes in the normal manner. In this instance, the driven shaft S tends to rotate faster than the driving shaft D with the result that the impellers 33 and 37 rotate to pump hydraulic fluid to the chamber P which results in the closing of the valve 70. The driven shaft S and the driving shaft D are then locked together as an integral unit as previously described, and the compression of the engine is utilized for braking purposes during the time the power vehicle travels down hill.

In the utilization of my hydraulic transmission T in a power vehicle it is of course desirable to have a conventional reversing gear (not shown) situated in the driving shaft D between the source of motive power and the hydraulic transmission T.

Although I have shown a rotary type gear pump to furnish the necessary hydraulic fluid to actuate my transmission T, it will be apparent that a reciprocating pump may be used for this purpose by either incorporating it as an integral part of the transmission or as an auxiliary piece of equipment. Similarly, it will be apparent that the two valves 70 and 90 shown in my transmission can be replaced should it be desired by a single valve which is capable of performing the functions of the two valves.

Thus, I have described a transmission which automatically increases the ratio between the driven and driving shaft as the load increases, and automatically decreases the ratio as the load decreases, with this action taking place throughout the entire range from the highest ratio to that of one to one.

While the above described hydraulic transmission is fully capable of attaining the objects and providing the advantages hereinbefore stated, it is to be understood that it is merely illustrative of the presently preferred form of my invention, and that I do not mean to limit myself to the details of construction and design herein shown other than as defined in the appended claims.

I claim:

1. A hydraulic transmission which includes: a substantially cylindrical housing adapted to holding a hydraulic fluid; a pair of cover plates, with each of said plates covering one end of said housing, and one of said plates having concentric high pressure and low pressure fluid chambers formed thereon; a driving gear rotatably mounted in said housing; a driven gear rotatably mounted in said housing; gear means operatively connecting said driving and driven gear, with a portion of said means acting as a pump for the pumping of hydraulic fluid to said high pressure chamber; a valve controlling the flow of fluid from said high pressure to said low pressure chamber, with said valve closing to prevent such flow when the velocity of fluid flowing from said high pressure chamber exceeds that which said fluid has when said driving shaft rotates at idling speed; and pressure relief means adapted to open to permit flow of fluid from said high pressure chamber to said low pressure chamber when the pressure in said high pressure chamber exceeds a predetermined pressure, and said valve offering a sufficient resistance to the flow of said fluid therethrough that as the speed of rotation of said driving gear is increased a point is reached at which the fluid back pressure on said pump means is sufficient to prevent the operation of said means and said housing, driving gear and driven gear rotate as an integral unit.

2. A hydraulic transmission which includes: a substantially cylindrical housing adapted to holding a hydraulic fluid, with said housing being formed with a centrally disposed recess on each side thereof, with one of said recesses being in communication with a plurality of chambers formed on one side of said housing, and the other of said recesses being in communication with a plurality of cavities formed in the other side of said housing; a driving gear rotatably mounted in one of said recesses; a driven gear rotatably mounted in the other of said recesses; a plurality of pinions, with each of said pinions being rotatably mounted in one of said chambers and engaging said driving gear; a plurality of pump gears, with each of said gears engaging said driven gear; a plurality of shafts with each of said shafts extending through said housing to connect one of said pinions and pump gears; a pair of cover plates, with each of said cover plates affixed to one end of said housing, and each of said plates being formed with a bore and fluid retaining means through which two shafts can extend to be affixed to said driving and driven gears; two concentric flanges extending outwardly from one of said plates, with said flanges forming a high pressure and low pressure fluid chamber; a cover plate affixed to the outer faces of said flanges; a valve extending through said flanges, with said valve permitting hydraulic fluid to flow from said high pressure to said low pressure chamber so long as the velocity of flow of said liquid remains below a predetermined rate, with said valve closing to prevent further flow of said fluid from said high pressure to said low pressure chamber when the velocity of said liquid exceeds said predetermined rate; means to conduct fluid from said pump gears to said high pressure chamber; means to conduct fluid from said low pressure chamber to said pump gears; and a relief valve in communication with said high pressure chamber, with said valve being normally closed but opening when the fluid pressure in said high pressure chamber exceeds a predetermined amount to permit fluid to flow to said pump gears, and said valve offering a sufficient resistance to the flow of fluid therethrough that as the speed of rotation of said driving shaft is increased a point is reached at which the fluid back pressure on the pump gears is sufficient to prevent their rotation and said housing, driving shaft and driven shaft rotate as an integral unit.

3. A hydraulic transmission which includes: a substantially cylindrical housing adapted to hold a hydraulic fluid, with said housing formed with a centrally disposed recess in each side thereof, with one of said recesses in communication with a plurality of chambers formed on one side of said housing, and the other of said recesses in communication with a plurality of cavities formed on the other side of said housing; a driving gear rotatably mounted in one of said recesses; a driven gear rotatably mounted in the other of said recesses; a plurality of pinions, with each of said pinions engaging said driving gear; a plurality of pump gears, with each of said gears being rotatably mounted in one of said cavities, and each of said gears engaging said driven gear; a cover plate affixed to said housing, with said plate having a fluid chamber provided thereon, and said chamber in communication with each of said pump gears; a valve controlling the flow of fluid from said fluid chamber, with said valve permitting said flow when said driving gear rotates at idling speed, but said valve assuming a closed position when the fluid passing therethrough exceeds a predetermined velocity whereby the rotation of said pump gears is restricted; and a spring loaded valve in communication with said fluid chamber and said pump gears, with said valve normally in the closed position, but said valve opening to permit flow of fluid to said pump gears when the fluid pressure in said fluid chamber exceeds a predetermined amount, and said valve remaining in the open position until said fluid pressure drops below said predetermined amount due to said driving and driven gears rotating at substantially the same speed.

4. A torque transmitting device which includes: a housing having a fluid chamber; a driving and a driven gear rotatably mounted in said housing; a plurality of gears operatively connecting said driving and driven gears, with said connecting gears also serving to pump hydraulic fluid to said chamber; a valve interposed between said chamber and said connecting gears; and spring means normally biasing said valve to an open position thereby permitting the flow of fluid from said chamber back to said connecting gears during the time said driving gear rotates at idling speed, said valve being adapted to be moved to a closed position against the force of said spring means solely by the imposition against said valve of fluid back pressure generated by said connecting gears whenever the rotation of said driving gear exceeds said idling speed whereby the fluid back pressure on said connecting gears is sufficient to prevent their rotation and said housing, driving gear and driven gear rotate as an integral unit.

5. A hydraulic transmission which includes: a substantially cylindrical housing adapted to hold a hydraulic fluid; a pair of cover plates, with each of said plates covering one of the ends of said housing, and one of said plates having a fluid chamber formed as a part thereof; a driving gear rotatably mounted in said housing; a driven gear rotatably mounted in said housing; gear means operatively connecting said driving and driven gears, with a portion of said gears acting as a gear pump for the pumping of hydraulic fluid; a valve controlling the discharge of fluid from said chamber, with said chamber being in communication with said pump gears to receive the discharge of hydraulic fluid therefrom; and spring means biasing said valve to an open position to thereby permit flow of fluid from said chamber to said gears, said valve being adapted to be moved to a closed position against the force of said spring solely by the imposition upon a surface of said valve fluid back pressure generated by said gears whenever said driving gear exceeds idling speed whereupon said housing, driving gear and driven gear rotate as an integral unit.

6. A torque transmitting device which includes: a housing having a fluid chamber; a driving and a driven gear rotatably mounted in said housing; a plurality of gears operatively connecting said driving and driven gears, with said connecting gears also serving to pump hydraulic fluid to said chamber; a valve interposed between said chamber and said connecting gears; spring means normally biasing said valve to an open position thereby permitting the flow of fluid from said chamber back to said connecting gears during the time said driving gear rotates at idling speed, said valve being adapted to be moved to a closed position against the force of said spring means solely by the imposition against said valve of fluid back pressure generated by said connecting gears whenever the rotation of said driving gear exceeds said idling speed whereby the fluid back pressure on said connecting gears is sufficient to prevent their rotation and said housing, driving gear and driven gear rotate as an integral unit; and a normally closed pressure relief valve interposed between said chamber and said connecting gears, said pressure relief valve being adapted to open whenever the differential in speed of rotation between said driving and said driven gears exceeds a predetermined value.

7. A hydraulic transmission which includes: a housing adapted to hold a hydraulic fluid; a driving gear rotatably mounted in said housing; a driven gear rotatably mounted in said housing; gear means operatively connecting said driving and driven gear, with a portion of said means acting as a pump for the pumping of said fluid; a high pressure and a low pressure chamber, said high pressure chamber being in fluid communication with said gear means; a valve controlling the flow of said fluid from said high pressure to said low pressure chamber, with said valve closing to prevent such flow when the velocity of fluid flowing from said high pressure chamber exceeds that velocity which said fluid has when said driving gear rotates at idling speed; and pressure relief means adapted to open to permit flow of said fluid from said high pressure chamber to said low pressure chamber when the pressure in said high pressure chamber exceeds a predetermined pressure, with said valve offering a sufficient resistance to the flow of said fluid therethrough that as the speed of rotation of said driving gear is increased a point is reached at which the fluid back pressure on said pump means is sufficient to prevent the operation thereof and to force said housing, driving gear, and driven gear to rotate as an integral unit.

LYSLE E. SOMERS.

References Cited in the file of this patent

UNITED STATES PATENTS

| Number | Name | Date |
| --- | --- | --- |
| 1,752,385 | Johnson | Apr. 1, 1930 |
| 2,209,949 | McCormack | Aug. 6, 1940 |
| 2,330,375 | Orner | Sept. 28, 1943 |
| 2,358,058 | Crites | Sept. 12, 1944 |
| 2,420,305 | Donahew et al. | May 13, 1947 |
| 2,484,015 | Cochran | Oct. 11, 1949 |